O. HOCH.
METHOD OF MAKING HANDLES FOR KNIVES, FORKS, AND TOOLS.
APPLICATION FILED AUG. 4, 1913.
1,167,404.
Patented Jan. 11, 1916.
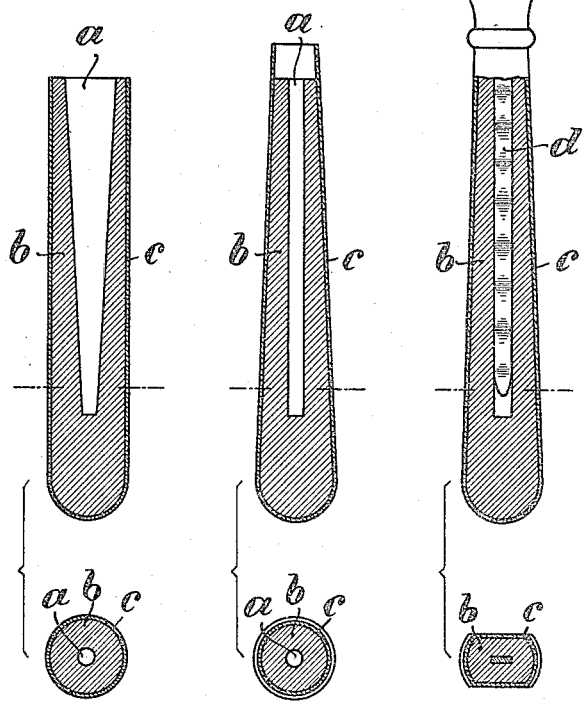

UNITED STATES PATENT OFFICE.

OTTO HOCH, OF NEUKÖLLN, GERMANY.

METHOD OF MAKING HANDLES FOR KNIVES, FORKS, AND TOOLS.

1,167,404.  Specification of Letters Patent.  Patented Jan. 11, 1916.

Application filed August 4, 1913. Serial No. 782,911.

*To all whom it may concern:*

Be it known that I, OTTO HOCH, manufacturer, subject of the King of Prussia, residing at Neukölln, in the Kingdom of Prussia and German Empire, have invented certain new and useful Improvements in Methods of Making Handles for Knives, Forks, and Tools, of which the following is a specification.

The present invention relates to a method of making handles for knives, forks and other implements.

In carrying out the present method, a seamless metallic sleeve $c$ closed at one end, as shown in Figure 1, is snugly fitted over a mandrel $b$ of wood, papier mâché or like material having at the outset an outwardly flaring bore $a$. The metallic sleeve, together with the core or mandrel are conically compressed between dies, until, as shown in Fig. 2, the inner bore $a$ which was previously tapering, becomes approximately cylindrical and adapted to receive the shank of the implement, which is preferably serrated. The shank or stem $d$ of the knife or other implement is then secured within the bore $a$, as shown in Fig. 3, in the usual manner, by compression in a second operation, the handle being at the same time molded and given any desired sectional shape. The surplus material of the sleeve at its open end is formed into a base for the collar at the base of the blade, to which it may be soldered in any approved manner. While a wooden mandrel is preferably used, any other material such as papier mâché or any similar light and soft material may be employed.

The handle according to the present invention is remarkable for its extremely light weight, which by no means impairs its strength. As the metal is merely a covering, it may be made very thin and will, therefore, be very cheap to produce. Furthermore, the metal is treated cold and will always retain its hardness.

What I claim and desire to secure by Letters Patent of the United States is:

The method of making handles for knives, forks and tools by inserting a wooden mandrel in a metallic tube closed at one end, the mandrel flaring toward the open end, and then compressing both the tube and core to a conical shape and then introducing the tang of the tool and compressing in a mold.

In testimony whereof I have affixed my signature in presence of two witnesses.

OTTO HOCH.

Witnesses:
 WOLDEMAR HAUPT,
 HENRY HASPER.

Copies of this patent may be obtained for five cents each, by addressing the "Commissioner of Patents, Washington, D. C."